Patented May 4, 1943

2,318,439

UNITED STATES PATENT OFFICE 2,318,439

PROCESS FOR PREPARING VAT DYES IN POWDER FORM

William Robert Waldron, Wilmington, Del., assignor to E. I. du Pont de Nemours & Company, Wilmington, Del., a corporation of Delaware No Drawing. Application June 24, 1941,
Serial No. 399,569

2 Claims. (Cl. 8—34)

This invention relates to the preparation of vat dye powders, suitable for use in the usual printing and pigment pad dyeing processes.

In the preparation of vat dye powders difficulty has been experienced in obtaining the colors in a form that is suitable for use in the usual vat dye printing processes and for use in the pigment pad reduction dyeing process. In these processes the colors are applied to the fiber in a highly dispersed water insoluble form and there reduced to a water soluble form to permit their adsorption by the fiber and then reoxidized to fix them in the fiber.

In the usual dyeing processes the vat colors are reduced to a water soluble form (leuco form) in the vat before being applied to the fibers. In such a process the physical form of the color particles prior to vatting is of little importance provided it is in a form that can be readily reacted upon by the alkaline hydrosulfite, usually employed in preparing the vat.

In the printing and pigment pad dyeing processes, however, the dye must be very finely divided so it can be suspended in a padding bath, or the printing gum and be evenly deposited on the fiber. The ultimate degree of subdivision is desired, provided the particle form is such that it does not tend to agglomerate into larger particles in the suspension, or coagulate in the printing paste preparations when certain reagents are present.

Methods have been perfected for reducing the color particles to a size and form that give satisfactory prints, and pigment pad dyeings, and this particle size can be maintained as long as the color is in paste form. However, on evaporating such pastes to dryness the dye particles agglomerate into larger aggregations which cannot be readily reduced to their original size by the known grinding or milling processes, and such dye powders even after repeated milling do not give satisfactory strengths in printing and pigment pad dyeing processes.

The preparation of dyes in powder form in certain cases is desirable. Pastes are bulky since they can seldom be produced with over 20% color content. Pastes also tend to dry out on standing, and the caked portions on the sides of the partially emptied containers become dried out and when incorporated again in the pastes cause specking and unevenness in the prints produced from such partially dried color. Pastes also settle if not properly protected in cold weather, making it necessary to rework them before they can be used.

It is therefore an object of this invention to prepare vat dyes in powder form that will be suitable for printing and pigment pad dyeing, as well as for use in the ordinary vat dyeing processes, and which give tinctorial strengths approaching those of the original pastes when applied to the fibers by such methods.

It is a further object of the invention to produce highly concentrated vat dye powders which require a minimum amount of diluent to retain them in a readily dispersible form, suitable for use in the usual printing and pigment pad dyeing processes.

According to this invention an aqueous paste of a well dispersed vat dye is treated with a suspension of the reaction product of an alkanolamine and a high molecular weight aliphatic acid, in the presence of a water soluble dispersing agent. After thorough mixing, an organic solvent-water emulsion is thoroughly mixed therewith and the mass is then dried down in a humidified air drier or a vacuum drier and preferably below the boiling point of the water or the organic solvent until the mass has "set" and then the temperature may be elevated somewhat. A wetting agent may be incorporated in the mass prior to the addition of the solvent emulsion, to aid in wetting out the resulting powder in subsequent use. Diluents such as sugars (dextrose, sucrose, etc.) or dextrine may be added as standardizing diluents before incorporation of the organic emulsion, or after drying and during the final milling of the product to put it in a finely divided form.

The dried product is preferably milled and then passed through a fluid type pulverizer in which a stream of air under high pressure carries the powdered dye into a vortex where it is ground by self attrition.

The water soluble dispersing agent may be the salt fraction of the reaction product of the alkanolamine and aliphatic acid, or it may be of any other type desired, such as the alkyl naphthalene sulfonic acids, the long chain aliphatic sulfates, etc.

The organic solvent may be any water immiscible inert organic liquid having a boiling point of about 110° to 160° C. so that it can be vaporized readily, such as toluene, the xylenes; petroleum hydrocarbon fractions, etc., and in which the dyestuff has practically no solubility. In such solvents the deflocculating agent is in part soluble so that it is carried in solution and deposited on the highly dispersed dye particles coating them to an extent that they no longer agglomerate in hard aggregates. When dried down, the dye coated with the deflocculating material is in a form that breaks down on milling to a powder having particles approximating the size of the particles in the original dry paste.

The deflocculating agents may be any of those prepared as more particularly described in U. S. Patent Re. 21,530 to Kritchevsky from an alkanolamine and a higher fatty acid or by effecting the reaction between the alkanolamine and the long chain fatty acid at lower temperatures such as 130 to 135° C. whereby a larger amount of the salt type bodies are formed which are dispersing agents for solids in aqueous solutions. In this reaction two types of bodies are produced, namely those resulting from the reaction of the aliphatic acid with the amine group which are referred to as salts and those resulting from the reaction of the acid with the hydroxyl groups on the alkanolamine which are esters. In this case the reaction mixture will be referred as a deflocculating agent.

The dye suspension emulsified with the toluene or other organic solvent may be evaporated to dryness without separating out the water soluble dispersing agents, or it may be filtered and then dried if desired. The dried powder is then standardized and a wetting agent is incorporated therewith to facilitate the wetting out of the powder when it is added to dyeing preparations.

In drying down the dye, the water and organic solvent are driven off, leaving a vat dye preparation that is easily milled to a readily dispersible powder which develops tinctorial strength in printing and pigment pad dyeing approximately equal that of the original dye paste.

The following examples are given to illustrate the invention. The parts used are by weight.

Example 1

A mixing kettle, equipped with efficient agitation and means of heating or cooling to between 10° C. to 100° C., is charged with one part of Bz-2:Bz-2'-dimethoxy dibenzanthrone (on a 100% basis) as a 16.9% well dispersed dyestuff paste, and 0.66 part of a deflocculating agent comprising triethanolamine lauric acid ester (prepared by heating 294 parts of lauric acid with 206 parts of triethanolamine at 130° to 135° C. under good agitation for three hours or until water is no longer evolved), in six parts of water at 70–80° C.

The mixture is agitated thoroughly and 0.071 part of isopropyl naphthalene beta sodium sulfonate, 0.30 part of dextrine and 0.15 part of sugar (sucrose) are added. The mass is then heated to 70° C. to 75° C. and circulated while hot through a colloid mill, set close. The milled mass is cooled to about 25° C. under efficient agitation. A toluene-water emulsion is then added, which may be prepared as follows:

Under efficient agitation, (suitable for emulsification) 0.53 part of water (20–30° C.), and 0.016 part of triethanolamine lauric acid ester (on a 100% basis) are thoroughly mixed and to this solution there is added slowly, 0.53 part of toluene to produce a stable toluene-water emulsion.

The mixture of dyestuff, triethanolamine lauric acid ester, the diluents and toluene-water emulsion are agitated for about one-half hour or until uniformly mixed. The resulting dyestuff paste is evaporated to dryness in a humidified drier at a temperature above or below the boiling point of water or toluene (at 760 mm. pressure). The dried product is then pulverized in suitable milling equipment and then passed through a colloidal powder mill.

The concentrated dyestuff powder obtained by the above procedure is particularly suitable for printing, dyeing and pigment pad dyeing and other applications in which dyestuff pastes are normally used.

We have found that concentrated dyestuff powders of as high as 80% color solids prepared as described in this example give printing strengths comparable with the strengths obtained from the original dye pastes.

Example 2

A mixer equipped for cooling and heating is charged with one part of monochloro indanthrone (100% basis) as a 16.4% well dispersed paste, and 0.066 part of triethanolamine lauric acid ester, (on a 100% basis) in 6 parts of water at 70 to 80° C. The mass is heated to 70–75° C. and thoroughly agitated by circulating while hot through a colloid mill (set close). The milled mass is cooled to about 25° C. and under vigorous agitation there is incorporated therewith a toluene-water emulsion prepared as described in Example 1. The dyestuff, triethanolamine lauric acid ester and toluene-water emulsion is agitated vigorously until a uniform mixture results.

The dyestuff paste is dried, pulverized (with the incorporation of .071 part of isopropyl naphthalene sodium sulfonate to act as a wetting agent) and milled as in Example No. 1.

This highly concentrated printing powder which may contain 80–95% of dyestuff (on an extracted solids basis) is suitable for printing, pigment pad dyeing and for other uses to which dyestuff pastes are normally put.

Printing powders of monochloro indanthrone, prepared as described in this example with high dyestuff content, exhibit excellent printing strength.

The above illustrated process may be employed in the preparation of vat color powders of the anthraquinone, indigo, or thioindigo series, for example those of the dibenzanthrone, isodibenzanthrone anthrimide, anthrimide-carbazole, pyranthrone, benzanthrone-anthraquinone-acridine type, and to any of the vat dyes which are suitable for use as pastes for printing or pigment pad dyeing.

I claim:

1. The process for producing vat dye powders suitable for use in printing and pigment pad dyeing of textile fibers which comprises, thoroughly incorporating in a highly dispersed aqueous suspension of a vat dye paste suitable for printing and pigment pad dyeing, a deflocculating agent comprising an ester of an alkanolamine and a long chain fatty acid, and an aqueous emulsion of an inert, volatile, water immiscible organic liquid, evaporating the product to dryness and pulverizing the resulting dried product to a fine powder, of a particle size approximately that of the original paste particles.

2. The process for producing vat dye powders suitable for use in printing and pigment pad dyeing of textile fibers which comprises, thoroughly incorporating in a highly dispersed aqueous suspension of a vat dye paste suitable for printing and pigment pad dyeing, a deflocculating agent comprising a triethanolamine lauric acid ester, and an aqueous emulsion of an inert, volatile, water immiscible organic liquid, evaporating the product to dryness and pulverizing the resulting dried product to a fine powder, of a particle size approximately that of the original paste particles.

WILLIAM ROBERT WALDRON.